(12) United States Patent
Saveliev et al.

(10) Patent No.: US 8,094,301 B2
(45) Date of Patent: *Jan. 10, 2012

(54) VIDEO AND THERMAL IMAGING SYSTEM FOR MONITORING INTERIORS OF HIGH TEMPERATURE REACTION VESSELS

(75) Inventors: Alexei V. Saveliev, Chicago, IL (US); Serguei A. Zelepouga, Hoffman Estates, IL (US); David M. Rue, Chicago, IL (US)

(73) Assignees: Gas Technology Institute, Des Plaines, IL (US); The Board of Trustees of the University of Illinois, Urbana, IL (US)

( * ) Notice: Subject to any disclaimer, the term of this patent is extended or adjusted under 35 U.S.C. 154(b) by 834 days.

This patent is subject to a terminal disclaimer.

(21) Appl. No.: 12/180,676

(22) Filed: Jul. 28, 2008

(65) Prior Publication Data

US 2009/0153658 A1    Jun. 18, 2009

Related U.S. Application Data

(63) Continuation-in-part of application No. 12/001,536, filed on Dec. 12, 2007, now Pat. No. 7,907,272.

(60) Provisional application No. 61/051,159, filed on May 7, 2008.

(51) Int. Cl.
*G01J 3/28* (2006.01)

(52) U.S. Cl. ........ 356/300; 348/276; 340/578; 250/554; 250/208.1; 385/117

(58) Field of Classification Search ............... 348/276; 250/208.1, 554; 385/117; 340/578
See application file for complete search history.

(56) References Cited

U.S. PATENT DOCUMENTS

| 3,971,065 | A | * | 7/1976 | Bayer | 348/276 |
|---|---|---|---|---|---|
| 4,328,488 | A | * | 5/1982 | Yanai et al. | 340/578 |
| 4,400,097 | A | | 8/1983 | Koschnitzke et al. | |
| 4,644,173 | A | * | 2/1987 | Jeffers | 250/554 |
| 4,711,524 | A | * | 12/1987 | Morey et al. | 385/117 |
| 5,086,220 | A | | 2/1992 | Berthold et al. | |
| 5,317,165 | A | * | 5/1994 | Montagna | 250/554 |
| 5,372,618 | A | | 12/1994 | Andrus, Jr. | |
| 5,828,797 | A | | 10/1998 | Minott et al. | |
| 6,042,365 | A | | 3/2000 | Chen | |
| 7,566,855 | B2 | * | 7/2009 | Olsen et al. | 250/208.1 |

OTHER PUBLICATIONS

U.S. Appl. No. 12/001,536, filed Dec. 12, 2007, Zelepouga et al.

* cited by examiner

*Primary Examiner* — Tammy Nguyen
(74) *Attorney, Agent, or Firm* — Mark E. Fejer

(57) ABSTRACT

A system and method for real-time monitoring of the interior of a combustor or gasifier wherein light emitted by the interior surface of a refractory wall of the combustor or gasifier is collected using an imaging fiber optic bundle having a light receiving end and a light output end. Color information in the light is captured with primary color (RGB) filters or complimentary color (GMCY) filters placed over individual pixels of color sensors disposed within a digital color camera in a BAYER mosaic layout, producing RGB signal outputs or GMCY signal outputs. The signal outputs are processed using intensity ratios of the primary color filters or the complimentary color filters, producing video images and/or thermal images of the interior of the combustor or gasifier.

13 Claims, 6 Drawing Sheets

C = Cyan
Y = Yellow
M = Magenta
G = Green
R = Red
B = Blue

| G | B | G | B | G | B |
|---|---|---|---|---|---|
| R | G | R | G | R | G |
| G | B | G | B | G | B |
| R | G | R | G | R | G |
| G | B | G | B | G | B |
| R | G | R | G | R | G |

| C | Y | C | Y |
|---|---|---|---|
| M | G | M | G |
| C | Y | C | Y |
| G | M | G | M |
| C | Y | C | Y |
| M | G | M | G |
| C | Y | C | Y |
| G | M | G | M |

↑
1st
Pixel

Fig. 1

(Prior Art)

VIDEO AND THERMAL IMAGING SYSTEM FOR MONITORING INTERIORS OF HIGH TEMPERATURE REACTION VESSELS

The U.S. Government has a paid-up license in this invention and the right in limited circumstances to require the patent owner to license others on reasonable terms as provided for by the terms of Contract No. DE-FC26-02NT41585 awarded by the U.S. Department of Energy.

BACKGROUND OF THE INVENTION

Field of the Invention

This invention relates to thermal imaging/video surveillance systems for monitoring the interiors of high temperature reaction vessels, such as combustors, gasifiers, furnaces, and boilers. More particularly, this invention relates to thermal imaging/video surveillance systems for real-time monitoring of the interiors of high temperature reaction vessels using fiber optic imaging and digital color CCD (charge coupled device) and CMOS (complementary metal oxide semiconductor) sensors. Real-time monitoring is highly desirable for improved stability, control, and optimization of combustion and gasification processes.

Presently available control methods are generally limited to the use of discrete temperature measurements and to monitoring of global system measurements performed using refractory embedded thermocouples or optical pyrometers. Such methods provide only point measurements that are often insufficient to assess temperature distribution over the entire refractory surface of the high temperature reaction vessel or to evaluate process quality. See, for example, U.S. Pat. No. 4,400,097 to Koschnitzke et al. which teaches a system for measuring temperatures in a high pressure reactor using an optical pyrometer which is in optical communication with a measuring duct which may be disposed in the reactor wall and is in optical communication with the reactor interior.

Applications of commercially available thermal imaging and pyrometer systems have been limited by a number of factors including the high cost of the systems and the inability to maintain reliable optical access to harsh, combustion/gasification environments. Thus, it is apparent that high pressure combustion and gasification processes would benefit substantially from non-intrusive imaging monitoring sensors that provide real-time monitoring of the process vessel interior. However, such processes present several challenges to measurements inside the combustor or gasification reactor vessels. For example, to effect temperature measurements within gasification reactor vessels using conventional means requires the insertion of a temperature probe into the gasifier. However, slag on the walls of the gasifier must be traversed by the probe if measurements are to be made within the interior of the gasifier. In addition, reliability of the measurements is difficult to obtain due to the harsh environment inside the gasifier in the form of dust particles, etc., which tend to obscure the temperature measuring device such that measurements therein may not be obtainable at all or, if obtainable, may be distorted. U.S. Pat. No. 5,372,618 to Andrus, Jr. teaches a temperature measuring device which includes a slag shield mounted on the gasifier so that a portion of the slag shield extends into the gasifier through an opening with which the gasifier is provided for this purpose, and which includes a temperature measuring instrument in the form of a radiation thermometer or optical pyrometer mounted in supported relation within the slag shield so that line-of-sight exists from the temperature measuring instrument into the interior of the gasifier at a point of interest for temperature measurement. The temperature measuring instrument is provided with cooling means for cooling at least the portion of the slag shield extending into the interior of the gasifier and is provided with purge gas means for supplying a flow of purge gas in the area around the temperature measuring instrument to purge particulate matter therefrom and, thus, ensure that the line-of-sight between the temperature measuring instrument and the interior of the gasifier remains unobscured.

SUMMARY OF THE INVENTION

It is one object of this invention to provide a low cost imaging system combining video and thermal imaging capabilities to monitor in real time the interior of high temperature reaction vessels.

It is another object of this invention to provide a system for significantly improving the quality of combustion control in high temperature reaction vessels by providing non-contact field temperature measurements with sufficient accuracy and reliability.

These and other objects of this invention are addressed by an imaging system for real-time monitoring of the interior of a high temperature reaction vessel comprising an imaging fiber optic bundle having a light receiving end and a light output end, a digital color camera comprising CCD or CMOS sensors and having a light receiving inlet in light transmission communication with the light output end of the imaging fiber optic bundle and comprising primary color, i.e. red, green, blue (RGB), or complimentary color, i.e. green, magenta, cyan, yellow (GMCY), filters placed over individual pixels of the sensors within the digital color camera in a BAYER mosaic layout, focusing means for focusing light to be received by the light receiving end of the imaging fiber optic bundle, which focusing means comprises a wall disposed between the light receiving end and a light source forming a pinhole opening aligned with the light receiving end, and processing means for processing the light received by the individual pixels to produce at least one of a video image and a thermal image of the interior of the high temperature reaction vessel.

These and other objects of this invention are further addressed by a method for real-time monitoring of the interior of a combustor or gasifier in which light emitted by an interior surface of a refractory wall of the combustor or gasifier is collected using an imaging fiber optic bundle having a light receiving end and a light output end. The color information in the collected light, which is output from the light output end of the imaging fiber optic bundle, is captured using primary color (RGB) filters or complimentary color (GMCY) filters placed over individual pixels of color sensors arranged in a BAYER mosaic layout disposed within a digital color camera, producing RGB or GMCY signal outputs. The signal outputs are then processed using intensity ratios of the primary color filters or the complimentary color filters, producing video images and/or thermal images of the interior of the combustor or gasifier which may be displayed on a suitable display, such as a video monitor.

The system of this invention provides substantial benefits to high pressure and temperature combustion and gasification processes by virtue of the novel non-intrusive reliable video surveillance/thermal imaging features of the system that provide spatially-resolved information on the combustion/gasification apparatus interior.

BRIEF DESCRIPTION OF THE DRAWINGS

These and other objects and features of this invention will be better understood from the following detailed description taken in conjunction with the drawings wherein:

FIG. 1 is a diagram providing representations of the Bayer mosaic RGB and GMCY patterns;

DETAILED DESCRIPTION OF THE PRESENTLY PREFERRED EMBODIMENTS

Figure 2A:
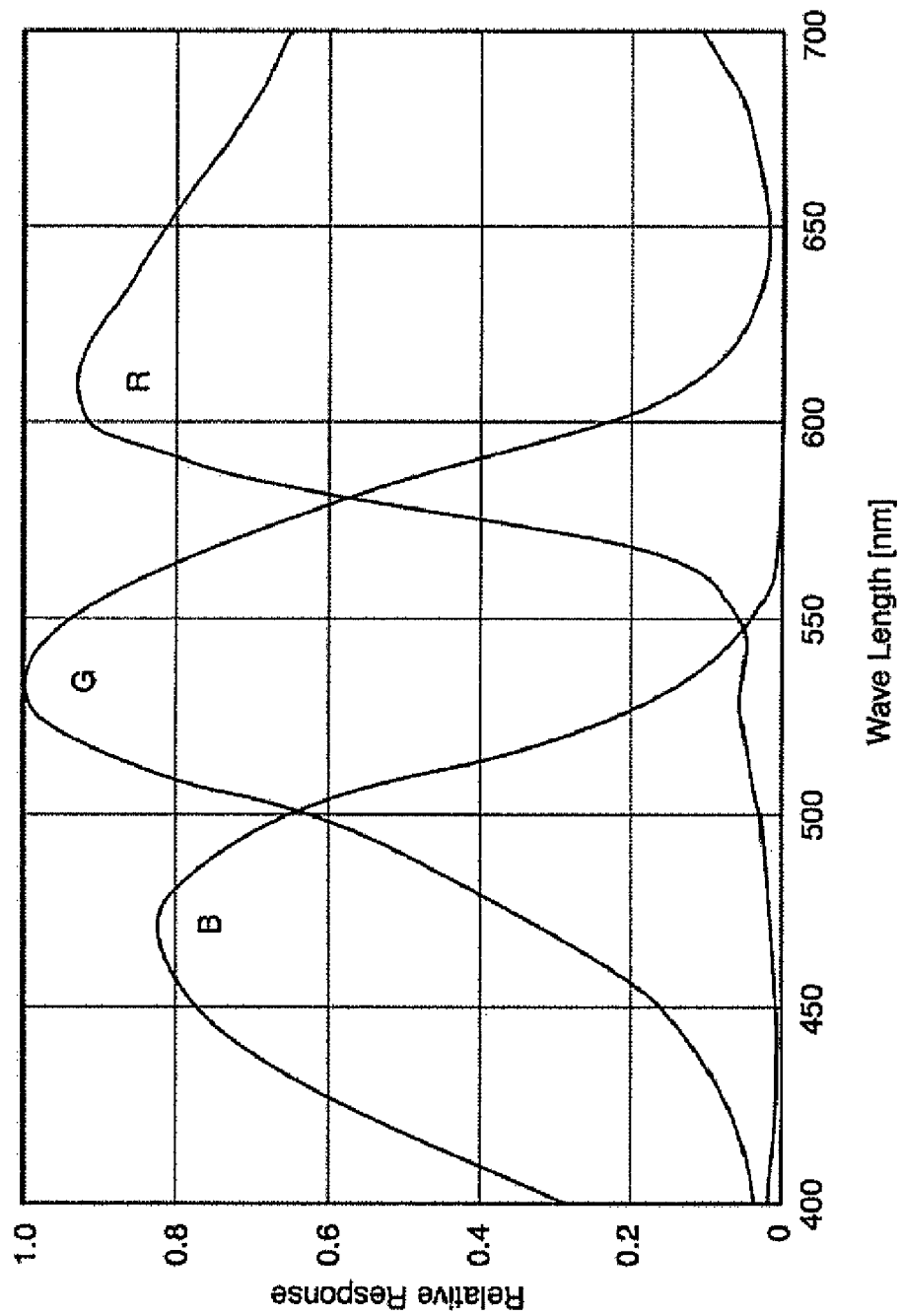
FIG. 2(*a*) is a diagram showing exemplary spectral sensitivity functions for RGB filters and FIG. 2(*b*) is a diagram showing exemplary spectral sensitivity functions for GMCY filters.
Figure 2B:
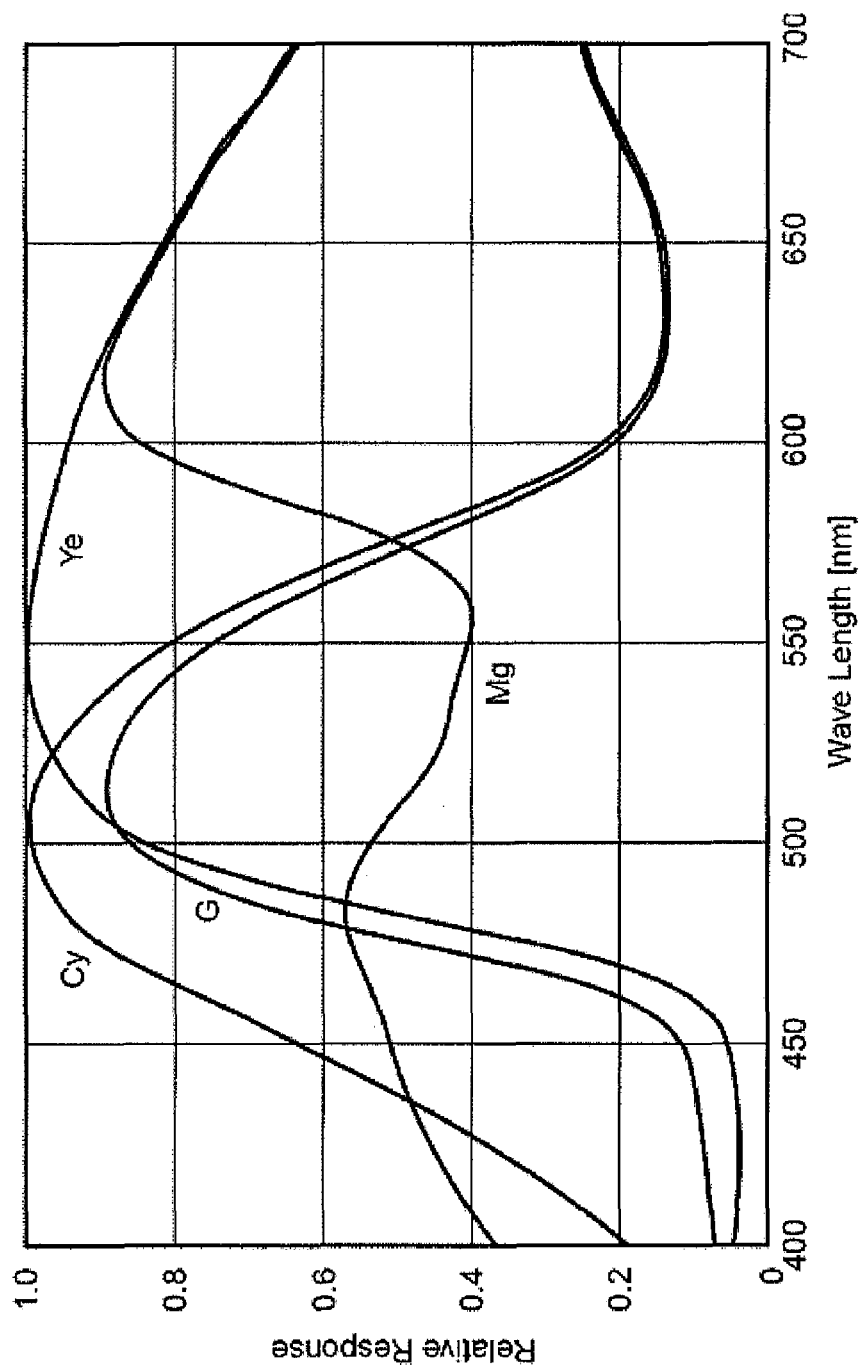

The video and thermal imaging system of this invention utilizes color digital signals and calibration functions for temperature recognition inside high temperature reaction vessels. The thermal imaging system of this invention comprises a digital CCD or CMOS color camera. The color sensors employed in these cameras possess high dynamic range, sensitivity, and fast imaging capabilities. The color sensors capture the color information via so-called primary color (red, green, blue) or complimentary color (green, magenta, cyan, yellow) filters placed over the individual pixels in a BAYER mosaic layout as shown in FIG. 1. For many cameras, the processing of color BAYER readouts can be performed outside the camera using a digital data processor or personal computer. This corresponds to the so-called raw data output mode of the camera. Because of the known and constant spectral sensitivities of various filters as shown in FIGS. 2(*a*) and 2(*b*), algorithms may be developed to convert the raw mode BAYER data outputs to the temperature data for each imaging pixel. The digitized signal of individual pixel filters in RGB or GMCY pattern are processed to infer the signal intensity ratios for each individual pixel, e.g. $I_G/I_R$, $I_B/I_R$, $I_G/I_B$. The camera is preliminarily calibrated using refractory material substantially identical to the refractory material in the reaction vessel. The calibration is performed over the temperature region of interest. The temperature calibration function is performed and the results stored in a refractory database of a digital processor. The temperature calibration function is a function of at least one intensity ratio but may also involve up to 3 intensity ratios for KGB patterns and up to 6 intensity ratios for GMCY patterns. The measured intensity ratios for each individual pixel are converted to temperature using the calibration functions stored in the database. The thermal image is formed based on the temperatures acquired for each individual pixel.

Figure 3:
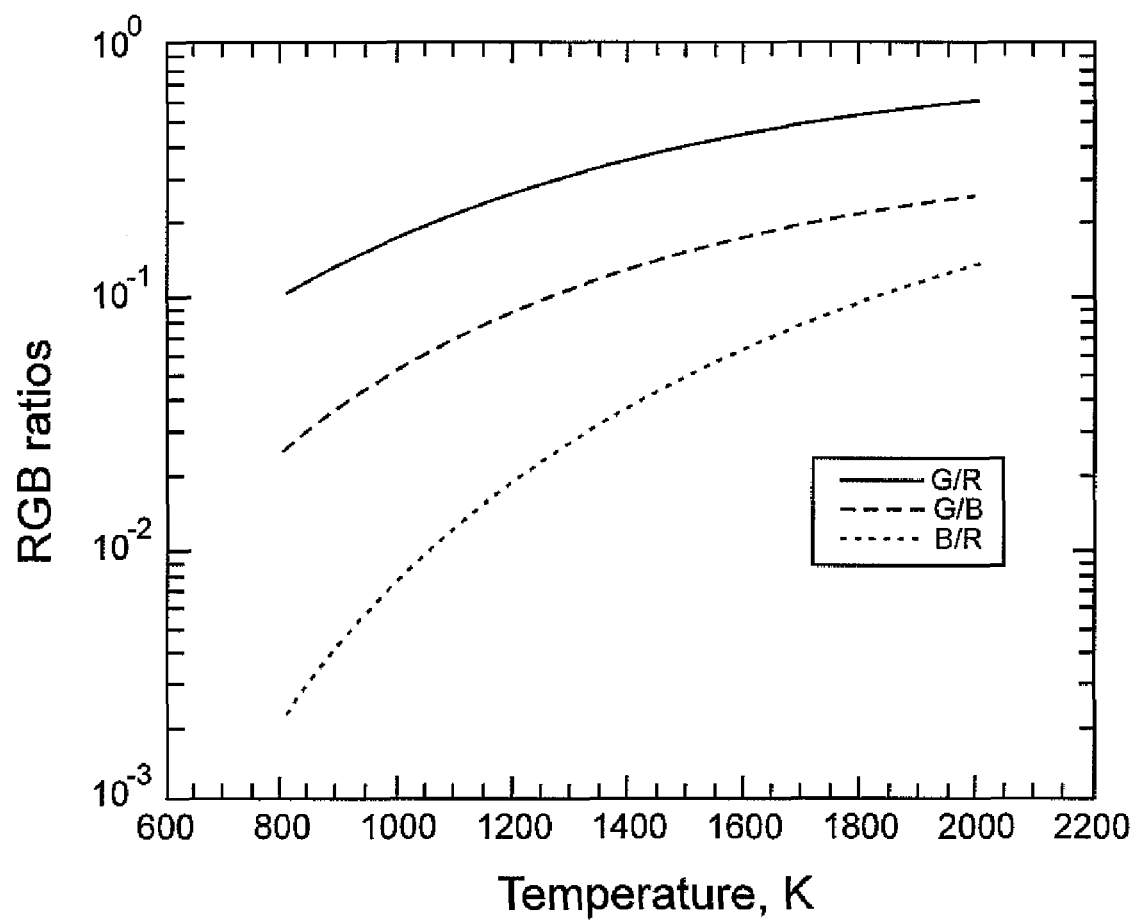
FIG. 3 is a diagram showing $I_G/I_R$, $I_B/I_R$, $I_G/I_B$ ratios as functions of temperature for illumination with an ideal black body source.

In this invention, the digital RGB or GMCY signals are used for performing low-cost thermal imaging using a specific processing algorithm. This algorithm reconstructs temperature T using intensity ratios for various color filters. The color recognition algorithm can be illustrated using theoretical black body intensity (Planck's law) and RGB filter sensitivities shown in FIGS. 2(*a*) and 2(*b*). Consider that black body radiation is directed to the camera sensor. The intensity of the radiation M(λ, T) is given by Planck's formula. The digital intensity outputs $I_R$, $I_G$, $I_R$ of the corresponding filters can be represented as:

$$I_R = K \int f_R(\lambda) M(\lambda,T) d\lambda$$

$$I_G = K \int f_G(\lambda) M(\lambda,T) d\lambda$$

$$I_B = K \int f_B(\lambda) M(\lambda,T) d\lambda$$

where $f(\lambda, T)$ are the spectral sensitivity functions of individual RGB filters and K is the proportionality coefficient. The intensity ratios $I_G/I_R$, $I_B/I_R$, $I_G/I_B$ are functions of temperature only and can be used for temperature recognitions. The calculated ratios $I_G/I_R$, $I_B/I_R$, $I_G/I_B$ are plotted as a function of temperature in FIG. 3. The spectral sensitivity functions shown in FIG. 2(*a*) are used. It can be clearly seen that temperature can be reconstructed with sufficient accuracy using these calculated calibration functions.

In a real imaging system illuminated by a gray body at temperature T, digital intensity outputs $I_R$, $I_G$, $I_R$ can be represented as:

$$I_R = K \int S(\lambda) f_R(\lambda) \epsilon(\lambda,T) M(\lambda,T) d\lambda$$

$$I_G = K \int S(\lambda) f_G(\lambda) \epsilon(\lambda,T) M(\lambda,T) d\lambda$$

$$I_B = K \int S(\lambda) f_B(\lambda) \epsilon(\lambda,T) M(\lambda,T) d\lambda$$

where $\epsilon(\lambda,T)$ is a spectral emissivity of radiating material that generally depends both on temperature and wavelength and $S(\lambda)$ is a spectral transmission function of the focusing optics. However, the intensity ratios $I_G/I_R$, $I_B/I_R$, $I_G/I_B$ remain the functions of temperature only and can be used for temperature recognitions. These intensity ratios $I_G/I_R$, $I_B/I_R$, $I_G/I_B$ can be calibrated against high temperature radiating sources and calibration functions stored and later used for temperature recognition. Using this algorithm, the function F can be obtained from the sensor calibration performed at a high temperature range for various refractory materials and stored in the computer database. In general, it may be represented as a function of one or more intensity ratios. However, the function of only one intensity ratio can be sufficient, e.g.:

$$T = F\left(\frac{I_B}{I_R}\right)$$

Figure 4:
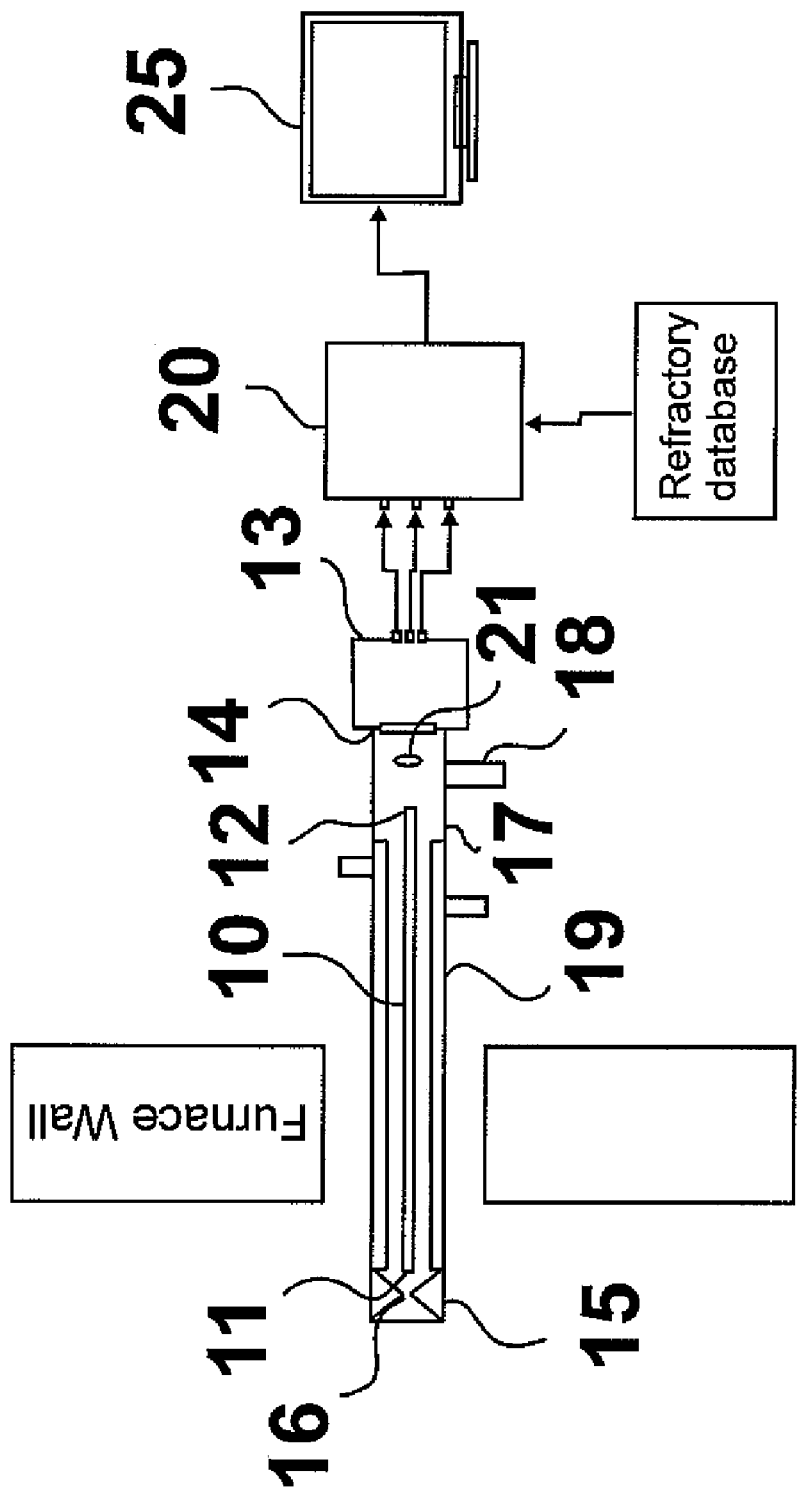
FIG. 4 is a diagram of a system for monitoring the temperature of gasification and combustion reactor vessel refractory walls in accordance with one embodiment of this invention.

FIG. 4 is a schematic representation of the salient features of the system of this invention. As shown therein, the system comprises an imaging fiber optic bundle 10 having a light receiving end 11 and a light output end 12 and a digital color camera 13 having a light receiving inlet 14 in light transmission communication with light output end 12 of imaging fiber optic bundle 10. In accordance with one embodiment of this invention, a relay lens 21 is provided to facilitate the transmission of light between the light output end 12 of the imaging fiber optic bundle 10 and the light receiving inlet 14 of the digital color camera 13. The digital color camera is provided with primary or complimentary color filters placed over individual pixels of sensors within the digital camera in a BAYER mosaic layout as shown in FIG. 1. Focusing means comprising a wall 15 disposed between light receiving end 11 and a light source, typically the interior of a gasification or combustion apparatus of interest, and forming a pinhole opening 16 aligned with light receiving end 11 of imaging fiber optic bundle 10 are provided for focusing light to be received by the imaging fiber optic bundle. Pinhole opening 16 acts to focus the light from within the high temperature reaction vessel received by the light receiving end of the fiber optic bundle.

As used herein, the term "pinhole" refers to openings having a diameter in the range of about 1 µm to about 1 mm. In accordance with one particularly preferred embodiment of this invention, pinhole opening 16 has a diameter in the range of about 10 µm to about 100 µm. Unexpectedly, the use of a pinhole opening obviates the need for focusing lenses, protective windows, or any other object intervening between the light receiving end of the imaging fiber optic bundle and the interior of the high temperature reaction vessel being monitored which could impact the measurement process.

To protect the imaging fiber optic bundle from the harsh environment of the gasification or combustion apparatus, the bundle is disposed within a housing 17 having a purge gas inlet 18 through which a purge gas, such as nitrogen, is introduced into the housing. In accordance with one embodiment of this invention, a water cooled jacket 19 is disposed around housing 17 for cooling.

As previously indicated, operation of the system of this invention for monitoring the temperature of gasification/combustion apparatus refractory walls requires calibration of the digital color camera using refractory material substantially identical to the refractory material in the gasification/combustion apparatus. The results of the calibration are stored in a database in a digital processor 20 which interfaces with the digital color camera 13 through communication means by which the digital RGB or GMCY signal output of the digital camera is transmitted into the digital processor as shown in FIG. 4. The digital video or thermal imaging output of the digital processor is transmitted into a suitable display 25, such as a video monitor, with which it is operably connected.

Figure 5:
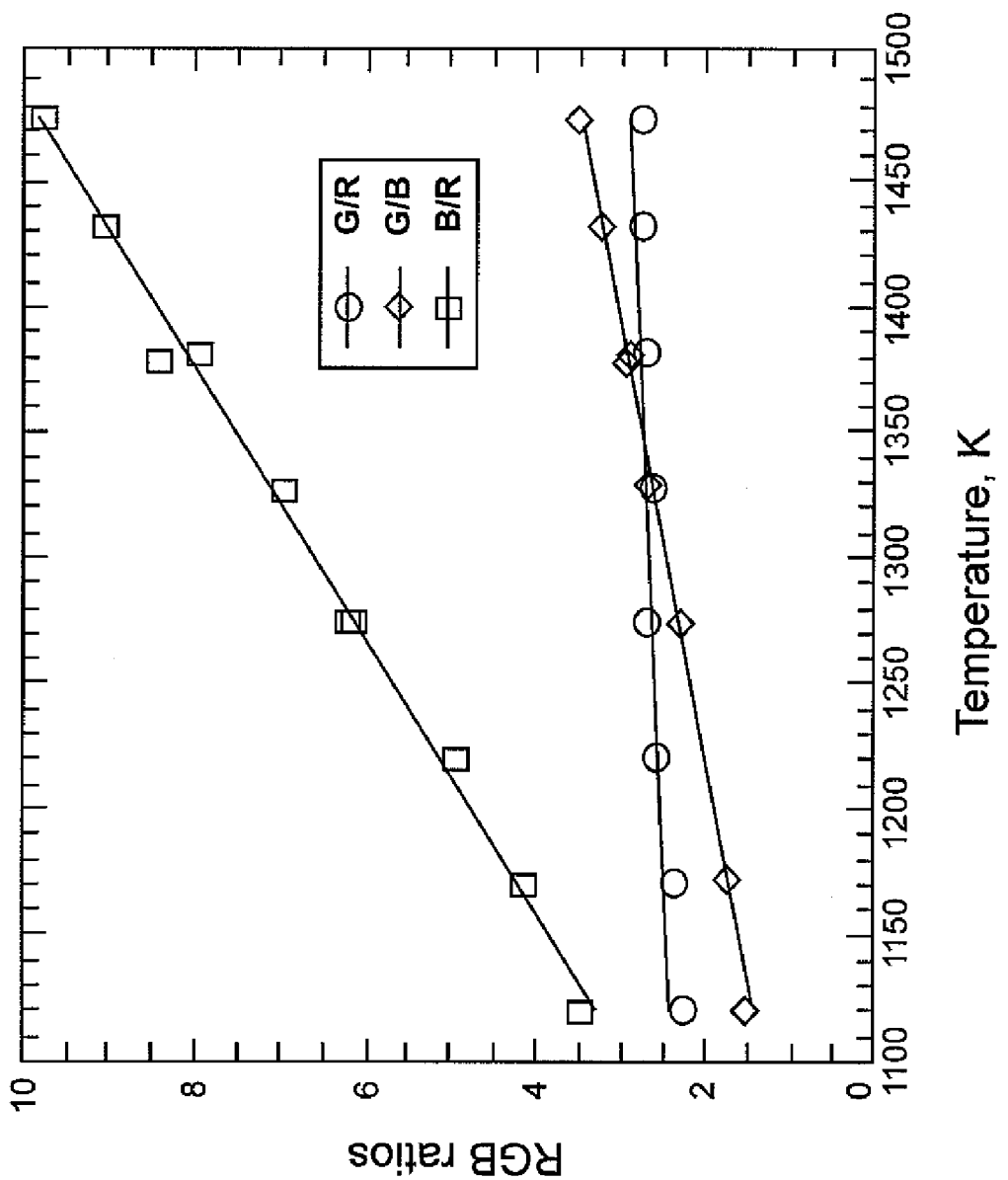
FIG. 5 is a diagram showing an exemplary experimental temperature calibration for use in accordance with one embodiment of this invention.

As shown in FIG. 4, during operation of the system of this invention for monitoring the temperature of gasification or combustion apparatus refractory walls, the imaging fiber optic bundle is inserted through an opening in one of the refractory walls of the gasification or combustion apparatus. Light emitted by the refractory walls is focused on the imaging bundle entrance with the focusing pinhole. The focusing element is capable of collecting light at a wide viewing angle covering an extended area. The fiber optic bundle is cooled by circulating water. The purging air (nitrogen) flow is used to prevent contamination of the transmitting and collecting optic with solid and liquid particles entrained in the swirling gases inside the gasifier/combustion system. The image is transmitted through the fiber optic bundle to the camera where it is digitized and recorded using red, green, and blue components. Further red, blue, and green intensities are processed to form intensity ratios. The temperature for each pixel is obtained using calibration functions (FIG. 5) that have been preliminarily recorded for the refractory material of the vessel. As a result, the temperature distribution over the full field of view is obtained and represented as a computer image.

As an example, the calibration function of a CCD digital color camera for alumina refractory material (FIG. 5) allows fast temperature recognition in the range from 1100 to 1500 K using simple linear temperature dependence on $I_B/I_R$ ratio. As a result, video and thermal imaging can be performed simultaneously for a real time process control.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An imaging system for real-time monitoring of an interior of a high temperature reaction vessel comprising:
    an imaging fiber optic bundle having a light receiving end and a light output end;
    a digital color camera comprising one of CCD and CMOS sensors and having a light receiving inlet in light transmission communication with said light output end and comprising one of primary color (RGB) and complimentary color (GMCY) filters placed over individual pixels of said sensors within said digital color camera in a BAYER mosaic layout;
    focusing means for focusing light to be received by said light receiving end of said imaging fiber optic bundle, said focusing means comprising a wall disposed between said light receiving end and a light source, said wall forming a pinhole opening aligned with said light receiving end; and
    processing means for processing said light received by said individual pixels to produce at least one of a video image and a thermal image of said interior of said high temperature reaction vessel.

2. The system of claim 1 further comprising viewing means for viewing said at least one of said video image and said thermal image operably connected with said processing means.

3. The system of claim 1 further comprising a relay lens disposed between said light outlet end of said imaging fiber optic bundle and said light receiving inlet of said digital color camera.

4. The system of claim 1 further comprising a housing disposed around said imaging fiber optic bundle, wherein said wall comprises one portion of said housing.

5. The system of claim 4 further comprising purge means for purging an inside of said housing.

6. The system of claim 4 further comprising cooling means for cooling an inside of said housing.

7. The system of claim 6, wherein said cooling means comprises a cooling jacket disposed on an exterior surface of said housing.

8. The system of claim 4, wherein said light receiving end of said imaging fiber optic bundle is in direct communication with light exterior to said housing.

9. The system of claim 1, wherein said pinhole opening has a diameter in a range of about 1 µm to about 100 mm.

10. The system of claim 9, wherein said diameter is in a range of about 10 µm to about 100 µm.

11. A method for real-time monitoring of an interior of a combustor or gasifier comprising the steps of:
    collecting light emitted by an interior surface of a refractory wall of said combustor or gasifier using an imaging fiber optic bundle having a light receiving end and a light output end;
    capturing color information in said light from said light output end with one of primary color (RGB) filters and complimentary color (GMCY) filters placed over individual pixels of color sensors disposed within a digital color camera in a BAYER mosaic layout, producing one of RGB signal outputs and GMCY signal outputs; and
    processing said signal outputs using intensity ratios of said one of said primary color filters and said complimentary color filters, producing at least one of video images and thermal images of said interior of said combustor or gasifier.

12. The method of claim 11, wherein said imaging fiber optic bundle is disposed within a housing and said light is focused by a pinhole formed by a wall of said housing disposed between said imaging fiber optic bundle and said interior surface of said refractory wall.

13. The method of claim 12, wherein an inside of said housing is purged using a purge gas.

* * * * *